United States Patent
Ishigame (10) Patent No.: US 12,491,360 B2
(45) Date of Patent: Dec. 9, 2025

(54) DEVICE AND METHOD FOR KEEPING HUMAN IN ELECTRIC CONTACT WITH TREE GROWING ON GROUND

(71) Applicant: Souichi Ishigame, Hiroshima (JP)

(72) Inventor: Souichi Ishigame, Hiroshima (JP)

( * ) Notice: Subject to any disclaimer, the term of this patent is extended or adjusted under 35 U.S.C. 154(b) by 356 days.

(21) Appl. No.: 18/204,949

(22) Filed: Jun. 2, 2023

(65) Prior Publication Data

US 2023/0310845 A1  Oct. 5, 2023

Related U.S. Application Data

(63) Continuation-in-part of application No. PCT/JP2021/043516, filed on Nov. 12, 2021.

(51) Int. Cl.
*A61N 1/20* (2006.01)
*A61N 1/04* (2006.01)
*A61N 1/14* (2006.01)

(52) U.S. Cl.
CPC ........... *A61N 1/205* (2013.01); *A61N 1/0472* (2013.01); *A61N 1/14* (2013.01)

(58) Field of Classification Search
None
See application file for complete search history.

(56) References Cited

U.S. PATENT DOCUMENTS

2008/0068773 A1*  3/2008  Ober ................. A61N 1/14
                                                    361/220
2023/0218092 A1*  7/2023  Jiménez Castillo ..... A61N 1/14
                                                          5/740

FOREIGN PATENT DOCUMENTS

| EP | 3417744 A | 12/2018 |
|---|---|---|
| JP | H07-288415 A | 10/1995 |
| JP | 3020789 U | 2/1996 |
| JP | 2006-68467 A | 3/2006 |
| JP | 2006-115677 A | 4/2006 |
| JP | 2020-116151 A | 8/2020 |
| KR | 2006-0109060 A | 10/2006 |

OTHER PUBLICATIONS

International Search Report for PCT/JP2021/043516 dated Dec. 21, 2021.
International Preliminary Report on Patentability for PCT/JP2021/043516 dated Oct. 17, 2022.
A therapy of relieving COVID-19 and stress by hugging the tree is actually proved method, Atsuo Tanaka, forest Journalist, Yahoo News Japan, Apr. 20.
J-Stage, Status of forest therapy in foreign countries (2) Europe, Iwao Uehara, Tokyo University of Agriculture.

(Continued)

*Primary Examiner* — Michael W Kahelin
(74) *Attorney, Agent, or Firm* — Yokoi & Co., U.S.A.; Toshiyuki Yokoi (57) ABSTRACT

A device, a health method, a disease treatment and a medical treatment where a tree growing on the ground is connected with a conductive material such as a futon, a bed mattress, a floor cushion, a carpet and a bed sheet at two portions or more by a conductive wire through which electricity can flow. A human lies or sits on the conductive material to create the state same as the state where the human is directly in contact with the tree for a long time in terms of electricity and potential.

4 Claims, 10 Drawing Sheets

(56) References Cited

OTHER PUBLICATIONS

Bioelectrical Potential and Tree, Kazuo Sumiya, Wood research and technical notes, (1986) 22: 1-9, Kyoto University Research Information Repository KURENAI.
Removing electromagnetic waves in human body, Method of static electricity detox, kenka2, updated on Oct. 17, 2018.
Blood flow is revived by static electricity detox (Takarajimasha, Inc.), Masashi Nishiya, summary.

* cited by examiner

DEVICE AND METHOD FOR KEEPING HUMAN IN ELECTRIC CONTACT WITH TREE GROWING ON GROUND

TECHNICAL FIELD

The present invention relates to a device, a health promotion method and a medical treatment for keeping a human in electric contact with a tree for a long time. In the above described device and the health method, the tree is connected with a conductive material or a conductive fiber by conductive wires and the human lies or sits on the conductive fiber so that an electric potential is equal between the human and the tree growing on the ground for a long time. The electric charge charged in a human body having high electric charge than that of the tree flows toward the tree through the conductive fiber or the conductive material via one of the conductive wires. On the contrary, the electric charge flows from the tree towards the electric charge charged in the human body having low electric charge than that of the tree via the other of the conductive wires. The conductive fiber or the conductive material should be electrically insulated from other materials (including the ground) having an electric potential and an electric charge than the tree so that the electric potential of the human is equal only to the electric potential of the tree growing on the ground. Because of this, an electrical insulator is sandwiched between the human and the other materials having an electric potential and an electric charge than the tree, for example.

BACKGROUND ART

There is a method of promoting health by directly touching the tree growing on the ground by hand or holding the tree by arms. It is considered that the above described method has the purpose that abnormal electric charge charged in the human is absorbed by the tree. The present invention enables the above described adsorption of the electric charge for a long time using the conductive fiber or the like. Non-patent Document 5 describes that it is good for health to touch the tree growing on the ground without sandwiching the electrical insulator for releasing abnormal electric charge.

PRIOR ART DOCUMENTS

Patent Documents

Patent Document 1: U.S. Patent Publication No. 2008/68773
Patent Document 2: Japanese Patent Publication No. 2006-115677
Patent Document 3: Japanese Patent Publication No. 2006-68467
Patent Document 4: Japanese Utility model Registration No. 3020789

Non-Patent Documents

Non-patent Document 1: A therapy of relieving COVID-19 and stress by hugging the tree is actually proved method, Atsuo TANAKA, forest journalist, Yahoo News Japan, April 20
Non-patent Document 2: J-STAGE, Status of forest therapy in foreign countries (2) Europe, Iwao UEHARA, Tokyo University of Agriculture
Non-patent Document 3: Bioelectrical Potential and Tree, Kazuo SUMIYA, Wood research and technical notes, (1986) 22: 1-9, Kyoto University Research Information Repository KURENAI
Non-patent Document 4: Removing electromagnetic waves in human body, Method of static electricity detox, kenka2, updated on Oct. 17, 2018
Non-patent Document 5: Blood flow is revived by static electricity detox (TAKARAJIMASHA, Inc.), Masashi NISHIYA

DISCLOSURE OF THE INVENTION

Problems to be Solved by the Invention

The present invention creates a state that the human and the tree growing on the ground are directly in contact with each other in terms of potential and electricity for helping to promote health and treat disease. It is difficult to hold the tree by arms for a long time. There is a health method for escaping abnormal electric charge in human body by touching the ground. However, the tree growing on the ground and living while performing photosynthesis and absorbing water is considered to be better for the human in terms of potential. This is because we humans evolved from anthropoid ape. The anthropoid ape lives on the tree. Thus, the electric potential and the electricity of the anthropoid ape are always equal to those of the tree. It is considered that we evolved from the anthropoid ape also carry genes where the electric potential equal to the tree is better for health.

Patent Document 2 uses the temperature of the tree. Therefore, a stainless plate is covered with a vinyl, which is an electrical insulator, in the embodiments. In the above describe configuration, the electric potential cannot be equal to the tree for a long time. Non-patent Document 3 does not aim for making the electric potential of the human be equal to that of the tree for a long time. Non-patent Document 3 does not disclose the idea of directly connecting the human with the tree without sandwiching the electrical insulator so that the electric potential of the human is equal to the electric potential of the tree for promoting health at all. We are evolved from the anthropoid ape. Monkeys and anthropoid ape live on the tree and always touch the tree directly with skin. Thus, the electric potential of them is considered to be equal to that of the tree. We humans may have genes where it is natural for us to live in a state that the electric potential is equal to that of the tree. In recent years, human body is exposed to abnormal electromagnetic wave with the development of mobile phones and electronic devices. Thus, abnormal electric charge may be stored in the human body. Patent document 1 aims for making the abnormal electric charge escape to the ground. However, the tree growing on the ground absorbs water, the tree is made of plant cells, and the tree performs photosynthesis. Thus, the tree has different electric potential from the ground (i.e., sand, soil). The anthropoid ape, which is an ancestor of the human, lives on the tree and does not always live on the soil. Therefore, there is a possibility that keeping the electric potential of the human to be equal to that of the tree is better for health of the human. This fact may be proved in the future. Non-patent Document 3 describes the potential difference between the tree and the ground.

If serious illness can be avoided by keeping in contact with the ground as shown in Patent document 1, professional surfers should live a long life. However, there are some professional surfers who died young from a serious illness. Since we are evolved from the anthropoid ape, it is healthier to live while keeping in contact with the tree for a long time in terms of potential. In Patent document 2, the connection is made by one conductive wire. The electrical charge actually transfers even by only one conductive wire. However, in Patent document 2, the stainless plate is covered with a vinyl, which is an electrical insulator and only the temperature is considered without considering the electric potential at all. Although it is possible to use one conductive wire, it is difficult to obtain the effect and difficult to transfer electricity. It is not impossible to make the electric potential be equal by connecting the tree and the conductive fiber or the conductive device using one conductive wire having high conductivity and the human touching the conductive fiber or the conductive device in a conduction state for a long time without sandwiching the electrical insulator. The inventor of Patent Document 4 considers that the electric potential of the tree growing on the ground is same as the electric potential of the ground. The inventor of Patent Document 4 considers to ground the human body. However, as described also in Non-patent Document 3, the electric potential of the ground is different from the electric potential of the tree growing on the ground. In the present invention, it is necessary to electrically insulate the human from the ground. Furthermore, the device and the method of the present invention aims for making the electric potential of the human be equal only to the electric potential of the tree growing on the ground for a long time.

Means for Solving the Problem

The tree growing on the ground is connected with a futon (Japanese-style bedding), a carpet, a bed mattress, a bed sheet or the like made of a conductive material at two or more portions by using conductive wires through which electricity can flow. The human lies on or sits on the carpet, the futon, the bed mattress or the floor cushion for a long time so that the human is in electrical contact with the tree for a long time.

The bed sheet, the bed mattress, the futon or the like is made of conductive fibers and is connected to the tree at two or more portions by using the conductive wires through which electricity can flow. The human lies on it so that the human is always actually in contact with the tree growing on the ground for a long time in terms of electricity and potential. The abnormal electric charge in the human is transferred from the surface of the human to the conductive bed sheet, the conductive bed mattress or the like through the conductive wires and escaped to the tree. Since the conductive wires are connected at two or more portions, the electric potential of the human can be equal to that of the tree. The abnormal electric charge is not escaped to the ground different from Patent document 1. The electric potential of the human is kept equal to that of the tree growing on the ground for a long time for helping to promote health. The directly contacting (touching) state means a state that an electricity can flow between the human and the tree. In other words, it means a state that an electrical current can flow between the human body and the tree. It is also possible that the conductive wires are attached to the conductive device such as a chair and the human is directly in contact with the conductive device on the skin in a state that an electricity can flow for helping to promote health. Not only positive electric charge but also negative electric charge may be stored in the human body. Therefore, the effect is increased when they are connected at two or more portions.

The electricity is difficult to flow when the conductive wire is one and the flow is unidirectional. Although the electric potential can be kept equal by only one conductive wire, the electric charge is difficult to escape from the body and a long time is required. This is because the electric potential of the human is higher than that of the tree in some portions of the human while the electric potential of the human is lower than that of the tree in the other portions of the human. In some cases, the electrical current flows from one of the conductive wires to the tree and the electrical current flows from the other of the conductive wires to the human. Of course, the electrical current may unidirectionally flow from the human to the tree in some cases. The tree growing on the ground has the electric potential different from that of the ground and the electricity can flow through the tree. The device made of the conductive material and the tree growing on the ground are connected with each other by the conductive wires. The human is kept in contact with the device for a long time without sandwiching the electrical insulator between the human and the device. At that time, the electric charge is prevented from entering from the other portions than the tree. The electrical insulator is sandwiched between the device and the ground, for example. In addition, it is possible to prevent the electric charge and the electric potential from entering into the device and the human from the other portions than the tree by using the electrical insulator.

Effects of the Invention

The human is in contact with the tree for a long time in terms of potential and electricity for promoting health and medical treatment. The bed sheet, the bed mattress, the futon or the like is made of conductive fibers and connected with the tree at two or more portions by using conductive wires through which electricity can flow. The human lies on it so that the human is always directly in contact with the tree growing on the ground in terms of electricity and potential. Abnormal electric charge in the human is transferred from the surface of the human to the conductive bed sheet, the conductive bed mattress or the like through the conductive wires and escaped to the tree. Since the conductive wires are connected at two or more portions, the electric potential of the conductive bed sheet or the like can be equal to that of the tree. The abnormal electric charge is not escaped to the ground different from Patent document 1. The electric potential of the human is kept equal to that of the tree growing on the ground for a long time for helping to promote health. The directly contacting (touching) state means a state that an electricity can flow between the human body and the tree. In other words, it means a state that an electrical current can flow between the human and the tree. Therefore, the conductive wires are attached to the conductive device such as the chair and the human is directly in contact with the conductive device on the skin in a state that an electricity can flow. Thus, the present invention can help to promote health. Not only positive electric charge but also negative electric charge may be stored in the human body. Therefore, the effect is increased when they are connected at two or more portions. The electricity is difficult to flow when the conductive wire is one and the flow is unidirectional. Although the electric potential can be kept equal by only one conductive wire, the electric charge is difficult to escape from the body and a long time is required. This is because the electric potential of the human is higher than that of the tree in some portions of the human while the electric potential of the human is lower than that of the tree in the other portions of the human. In some cases, the electrical current flows from one of the conductive wires to the tree and the electrical current flows from the other of the conductive wires to the human. Of course, the electrical current may unidirectionally flow from the human to the tree in some cases. The tree growing on the ground has the electric potential different from that of the ground and the electricity can flow through the tree. The conductive device means the device where a portion touched by the human on the skin is formed by conductive materials. The conductive wire is connected to the conductive portion to connect the conductive device with the tree. An electricity flows between the conductive device and the human.

BRIEF DESCRIPTION OF THE DRAWINGS

FIG. 8 is a drawing showing a state that a conductive material or conductive fiber (6) contacted with the tree (1) growing on the ground in a large area is connected with a conductive fiber or conductive material (6) contacted with a device (5) such as a chair made of conductive material in a large area by using a thick conductive wire (10). An electrical insulator (7) is sandwiched between the ground and the chair or the like made of the conductive material. The electric potential and the electric charge are prevented from entering from the other portions than the tree. The conductive material or the conductive fiber can be connected with the tree growing on the ground by binding the conductive material or the conductive fiber with a rubber or a rope or supporting the conductive material or the conductive fiber by the material made of the electrical insulator as shown in FIGS. 6 and 7.

MODES FOR CARRYING OUT THE INVENTION

Figure 1:
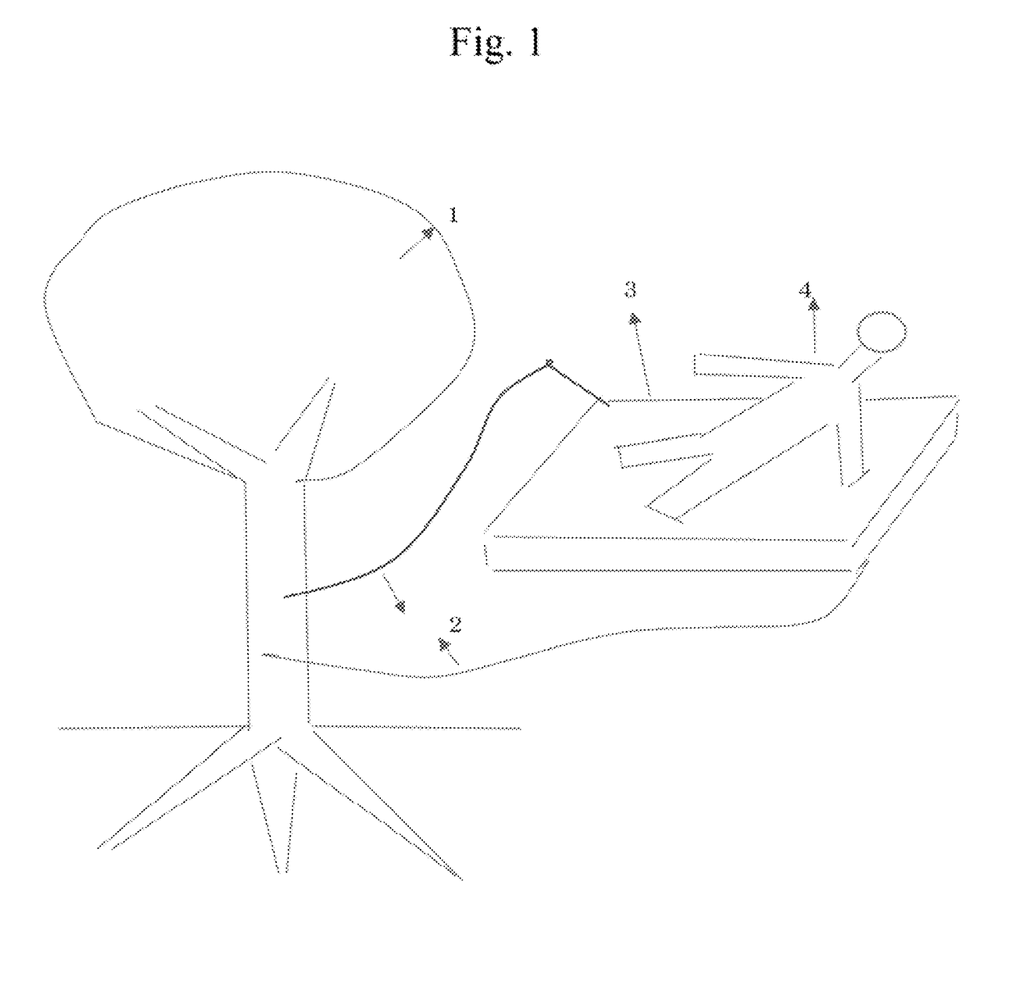
FIG. 1 is a drawing showing a state that a tree (1) growing on the ground is connected with a material (3) such as a futon, a bed mattress, a carpet, a floor cushion and a bed sheet made of conductive fiber or the like at two or more portions by using conductive wires (2) through which electricity can flow and a human (4) lies or sits on the material (3) without interposing the electrical insulator between the material (3) and the human (4).
Figure 2:
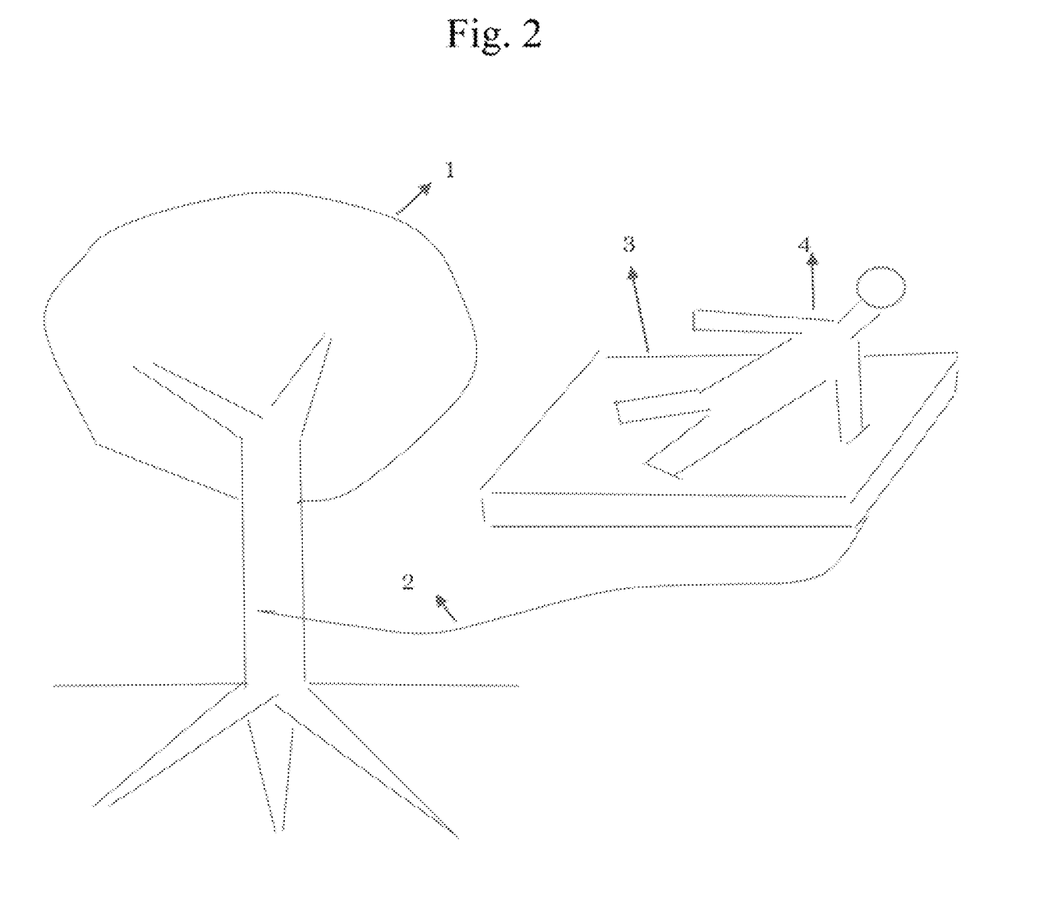
FIG. 2 is a drawing showing a state that a tree (1) growing on the ground is connected with a material (3) such as a futon, a bed mattress, a carpet, a floor cushion and a bed sheet (3) made of conductive fiber at one portion by using a conductive wire (2) through which electricity can flow and a human (4) lies or sits on the material (3) without interposing the electrical insulator between the material (3) and the human (4).
Figure 3:
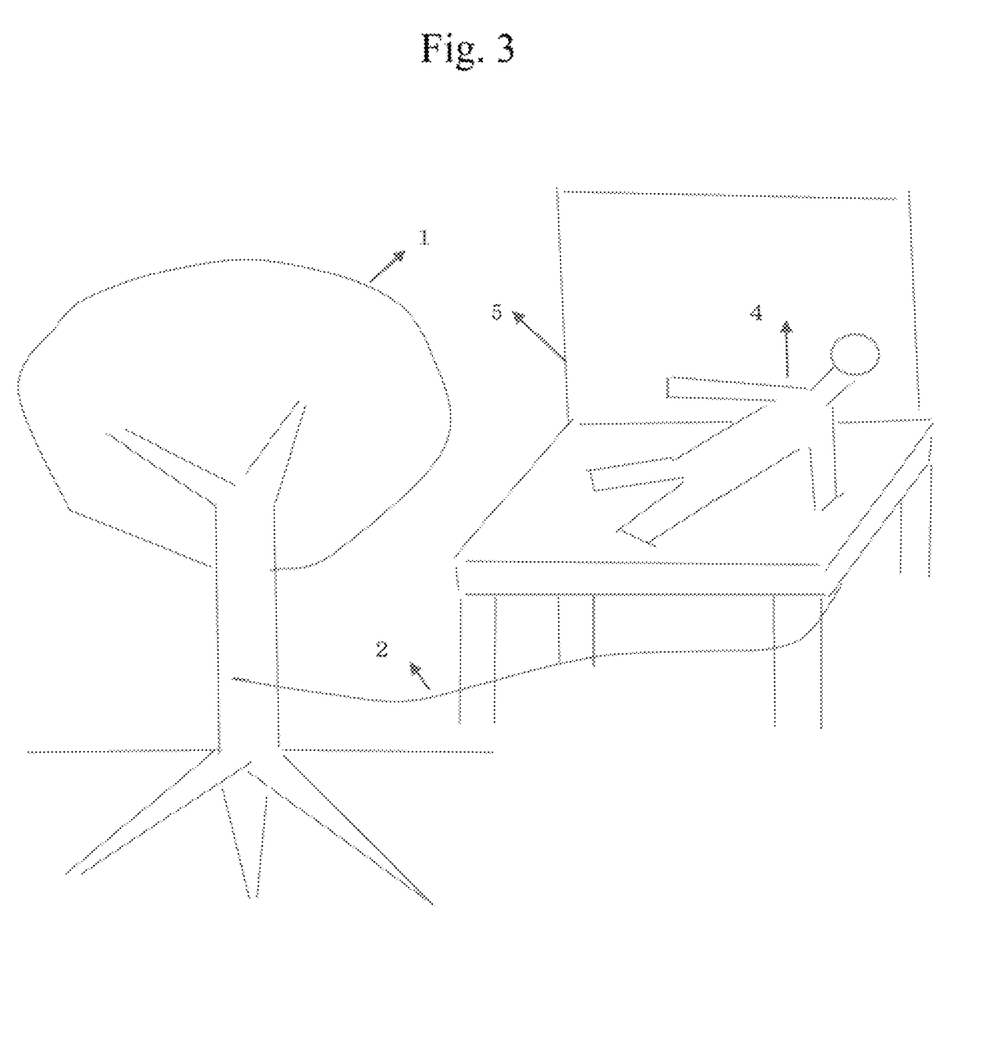
FIG. 3 is a drawing showing a state that a tree (1) growing on the ground is connected with a device (5) such as a chair made of conductive material at one portion by using a conductive wire (2) through which electricity can flow and a human (4) lies or sits on the device (5) without interposing the electrical insulator between the device (5) and the human (4).

As shown in FIG. 1, a tree growing on the ground is connected with a conductive material such as a futon, a bed mattress and a bed sheet at two or more portions by using conductive wires and a human lies on the conductive material or sits on the conductive material so that the human is directly in contact with the tree for a long time in terms of electricity and potential. The number of the conductive wires is not limited and the number of the portions to be connected with the tree is not limited as long as at least two portions are connected. The conductive wires are directly connected with the tree by a rubber or a gummed tape not to damage the tree. The conductive wires are also connected with the conductive material such as the futon, the carpet and the bed mattress at two or more portions so that an electricity can flow entirely. The human is in contact with the conductive material such as the carpet, the bed mattress and the futon without interposing the electrical insulator between the human and the conductive material. When some portions in the human body has higher electric potential than that of the tree, the electrical current transfers from an inside of the human body to a surface of the body and flows through the conductive fiber or the conductive material toward the tree via one of the conductive wires. When some portions in the human body has lower electric potential than that of the tree, the electrical current transfers from the tree to the conductive fiber or the conductive material via the other of the conductive wires and flows into the human body from the surface of the body. Although the current can flow by one conductive wire, it may take time until the electric potential of the human becomes equal to the electric potential of the tree growing on the ground. Ideally, the conductive wires are connected at two or more portions of the tree and two or more portions of the conductive material or the conductive fiber. The conductive wires are connected so that an electric current flows through the conductive material or the conductive fiber. The conductive fiber or the conductive material touched by the human should be prevented from contacting with other conductive materials and electrical appliances. The conductive fiber or the conductive material touched by the human should be contacted only with the tree growing on the ground via the conductive wires and insulated from the other conductive materials and the materials having electric charges. The conductive wires attached to the tree also should not receive electric stimulation. The electric charges should not enter the portion connecting the tree with the conductive wires from the other portions than the tree. The electrical insulator is sandwiched between the ground and the conductive fiber or the conductive material to prevent the electric charges from entering from the ground. The electrical insulator is sandwiched between the other materials having electric charge or electric potential and the conductive fiber or the conductive material. The conductive material or the conductive fiber touched by the human should be prevented from touching the materials such as a smartphone, a battery and an electrical appliance having electric charge except for the tree growing on the ground. The human is also prevented from touching the materials such as a smartphone, a battery and an electrical appliance having electric charge except for the tree growing on the ground.

The embodiments shown below are merely an example of the present invention. Thus, the present invention is not limited to the embodiments shown below. Namely, the present invention can be carried out in various embodiments by applying the known technology to the embodiments shown below and modifying the embodiments.

Embodiment 1

As shown in FIG. 1, a tree (1) growing on the ground is connected with a conductive fiber or conductive material (3) such as a bed sheet, a futon and a floor cushion at two or more portions by using conductive wires (2) and a human (4) lies or sits on the conductive fiber or conductive material (3). It is also possible to be wrapped in a bed sheet or a blanket. The conductive material such as the bed sheet is prevented from touching the other conductive materials and the materials having electric charge.

Embodiment 2

Figure 4:
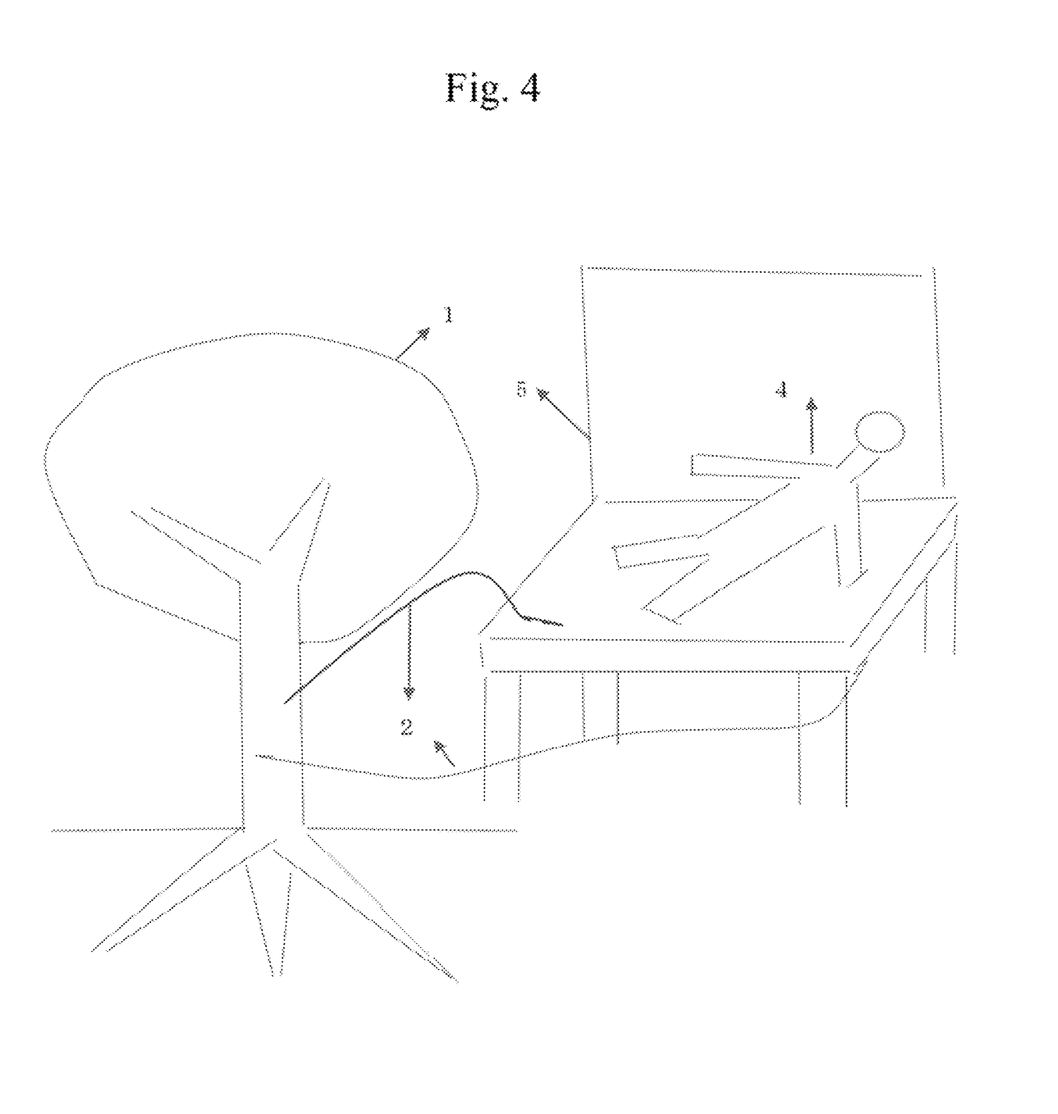
FIG. 4 is a drawing showing a state that a tree (1) growing on the ground is connected with a device (5) such as a chair made of conductive material at two or more portions by using conductive wires (2) through which electricity can flow and a human (4) lies or sits on the device (5) without interposing the electrical insulator between the device (5) and the human (4).

As shown in FIG. 4, the human can sit on or lie on the chair (5) made of the conductive material and connected with the tree (1) by the conductive wires without sandwiching the electrical insulator between the chair (5) and the human. The chair (5) or the like is prevented from touching the other conductive materials and electric charges.

Embodiment 3

Figure 5:
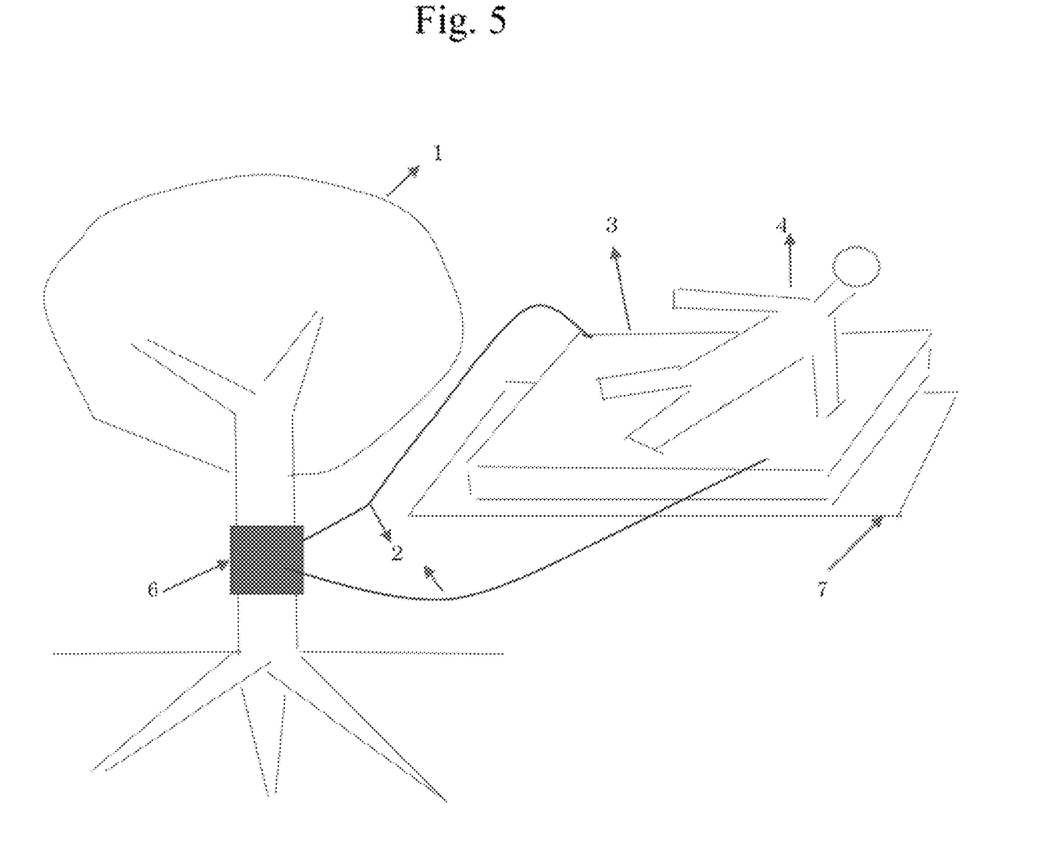
FIG. 5 is a drawing showing a state that a conductive material (6) is contacted with a tree (1) growing on the ground, the conductive material (6) is connected with a material (3) such as a bed sheet, a futon and a floor cushion made of conductive fiber by using conductive wires (2), and a human (4) lies or sits on the material (3) without interposing the electrical insulator between the material (3) and the human (4). An electrical insulator (7) is sandwiched between the ground and the material such as the bed sheet, the futon and the floor cushion to prevent the electric charge from entering from the other portions than the tree.

As shown in FIG. 5, the conductive material (6) is contacted with the tree (1) growing on the ground and the conductive material (6) is connected with the conductive material (3) such as the bed sheet, the futon and the floor cushion made of the conductive fiber by the conductive wires (2) and the human (4) can sit or lie on the conductive material (3) without sandwiching the electrical insulator between the conductive material (3) and the human. The electrical insulator (7) is sandwiched between the ground and the conductive material such as the bed sheet, the futon and the floor cushion to prevent the electric charges from entering from the other portions than the tree.

Embodiment 4

Figure 6:
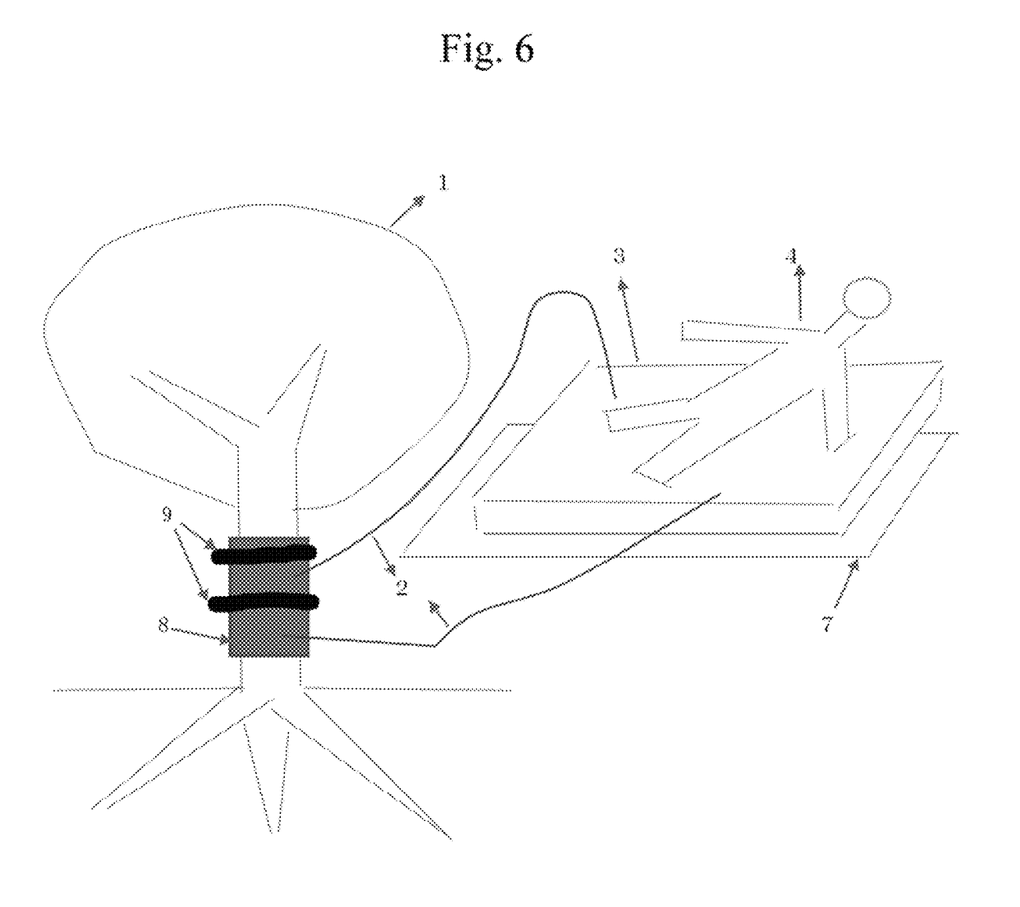
FIG. 6 is a drawing showing a state that a conductive fiber (8) is wound around a tree (1) by using a material (9) such as a rubber band and a rope not to damage the tree for preventing the electric charge from entering from the other portions than the tree and the conductive fiber (8) is connected with a conductive fiber (3) on which a human lies or sits for a long time by using conductive wires (2). The connection is made to prevent the electric charge from entering from the other portions than the tree growing on the ground. An electrical insulator (7) is sandwiched between the ground and the conductive fiber (3) with which the human is in contact.

As shown in FIG. 6, the conductive fiber (8) is connected with the tree (1) growing on the ground to prevent the electric charge from entering from the other portions than the tree by winding the material (9) such as a rubber band and a rope around the tree not to damage the tree and the conductive fiber (8) is connected with the conductive fiber (3) on which a human lies or sits for a long time by using the conductive wires (2). The electric charge is prevented from entering from the other portions than the tree growing on the ground. The electrical insulator (7) is sandwiched between the ground and the conductive fiber (3) with which the human is in contact.

Embodiment 5

Figure 7:
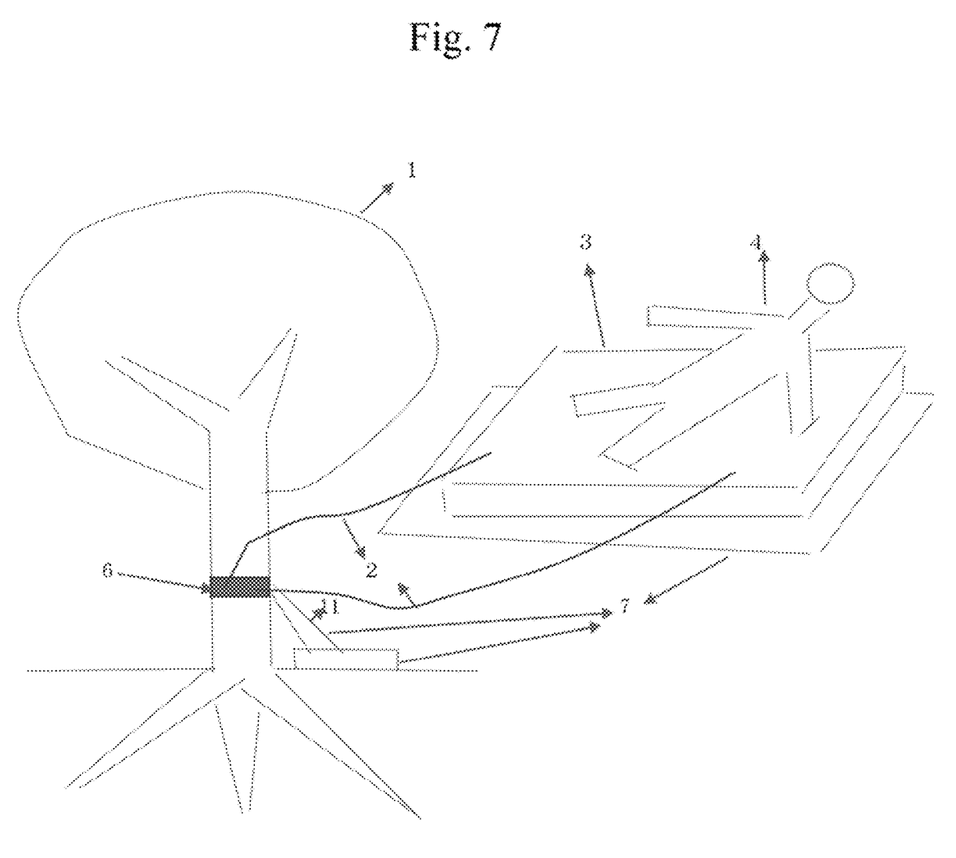
FIG. 7 is a drawing showing a state that a conductive material (6) is in contact with a tree (1) growing on the ground and the conductive material (6) is supported by a material (11) made of an electrical insulator. The conductive material (6) contacted with the tree is connected with a conductive fiber (3) on which a human lies or sits by using conductive wires (2). An electrical insulator (7) is sandwiched between the ground and the conductive fiber (3) on which the human lies and sits. The electric potential and the electric charge are prevented from entering from the other portions than the tree.

As shown in FIG. 7, the conductive material (6) is contacted with the tree (1) growing on the ground and the conductive material (6) is supported by the material (11) made of an electrical insulator. The conductive material (6) contacted with the tree is connected with the conductive fiber (3) on which the human lies or sits by using the conductive wires (2). The electrical insulator (7) is sandwiched between the ground and the conductive fiber (3) on which the human lies or sits. The electric potential and the electric charge are prevented from entering from the other portions than the tree.

Embodiment 6

Figure 8:
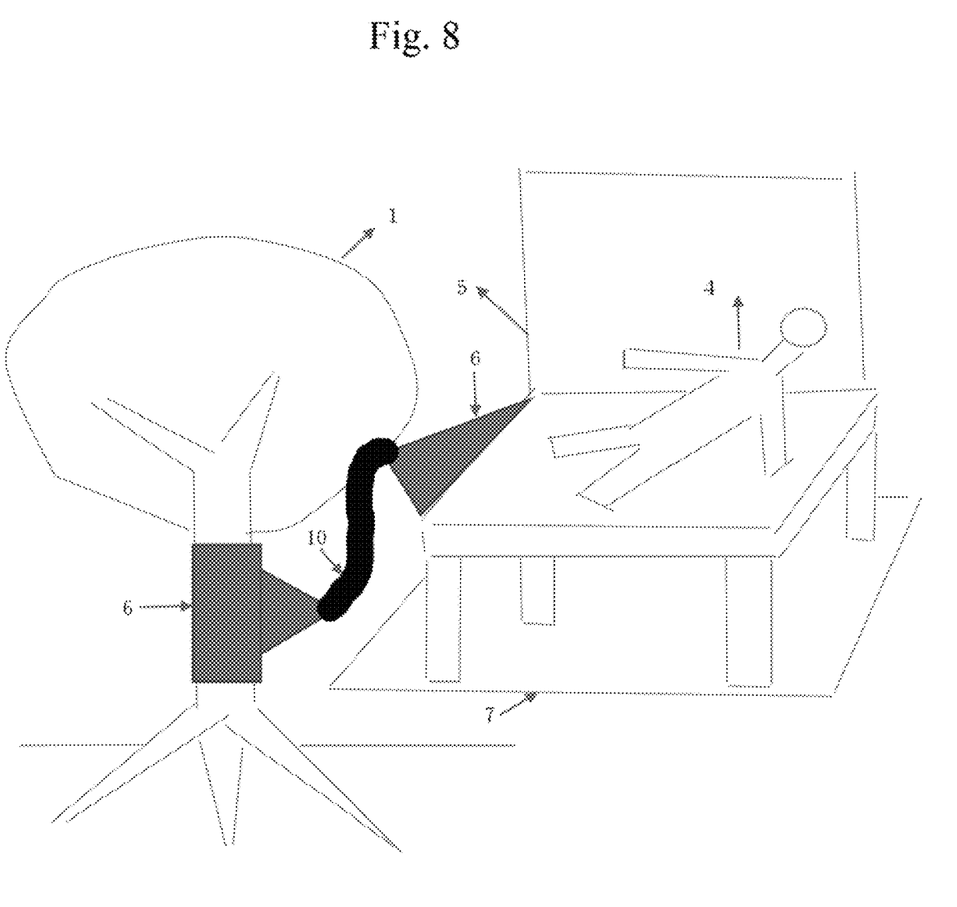

As shown in FIG. 8, the conductive material or the conductive fiber (6) contacting the tree (1) growing on the ground in a large area is connected with the conductive fiber or conductive material (6) contacting the chair (5) or the like made of the conductive material in a large area by using the thick conductive wire (10). The electrical insulator (7) is sandwiched between the ground and the chair or the like made of the conductive material. The electric potential and the electric charge are prevented from entering from the other portions than the tree. The conductive material or the conductive fiber can be connected with the tree growing on the ground by binding the conductive material or the conductive fiber with a rubber or a rope or supporting the conductive material or the conductive fiber by the material made of an electrical insulator as shown in FIGS. 6 and 7.

Embodiment 7

Figure 9:
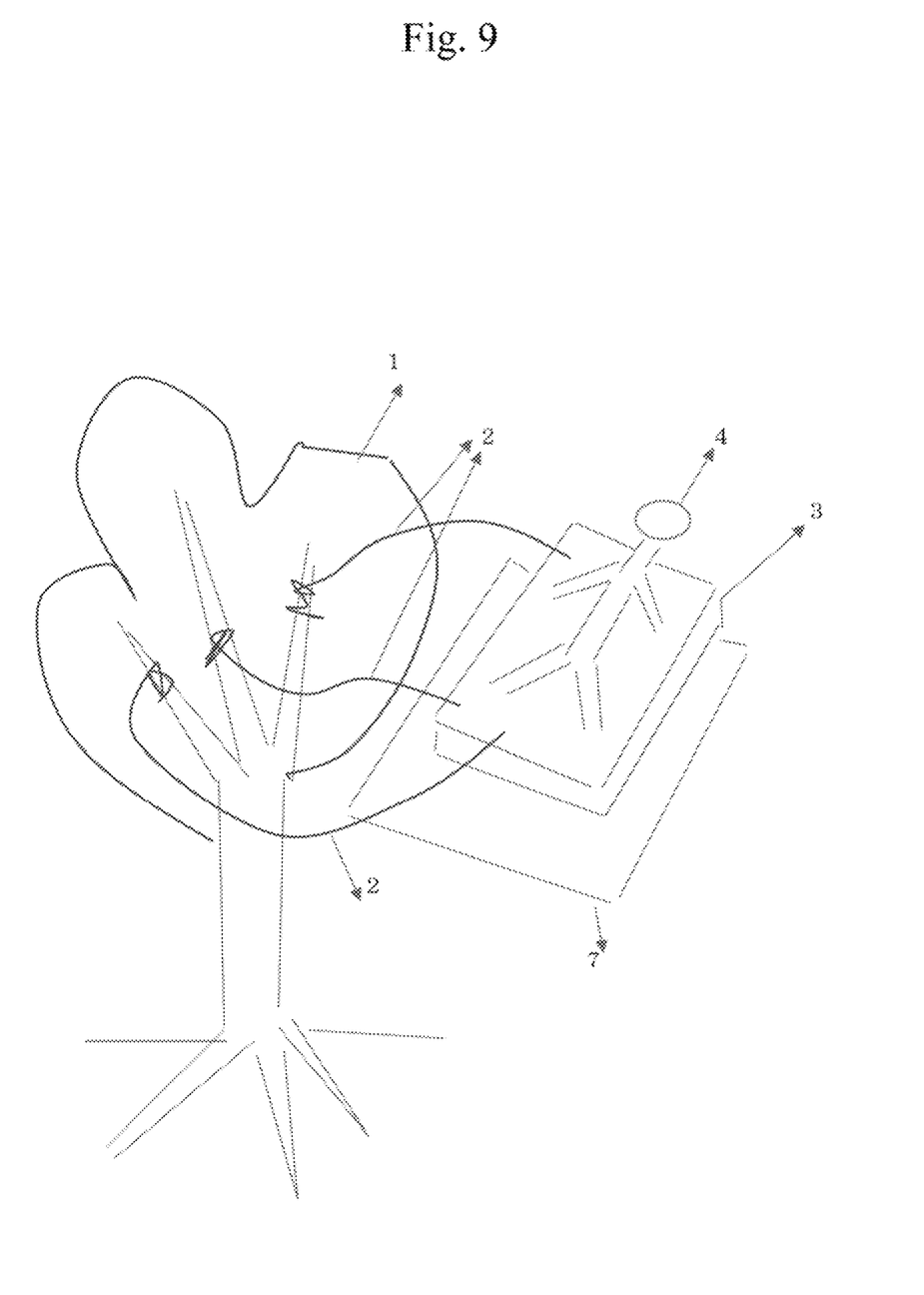
FIG. 9 is a drawing showing a state that conductive wires (2) are connected with branches or leaves of a tree (1) growing on the ground by winding the conductive wires (2) around the branches or the leaves and the conductive wires (2) are connected with a conductive fiber or conductive material (3) on which a human (4) sits or lies. The electric potential and the electric charge are prevented from entering from the other portions than the tree growing on the ground.

As shown in FIG. 9, the conductive wires are wound around branches or leaves of the tree (1) growing on the ground by winding the conductive wires around the branches or the leaves and the conductive wires are connected with the conductive fiber or the conductive material (3) on which the human (4) sits or lies. The electric potential and the electric charge are prevented from entering from the other portions than the tree growing on the ground.

Embodiment 8

Figure 10:
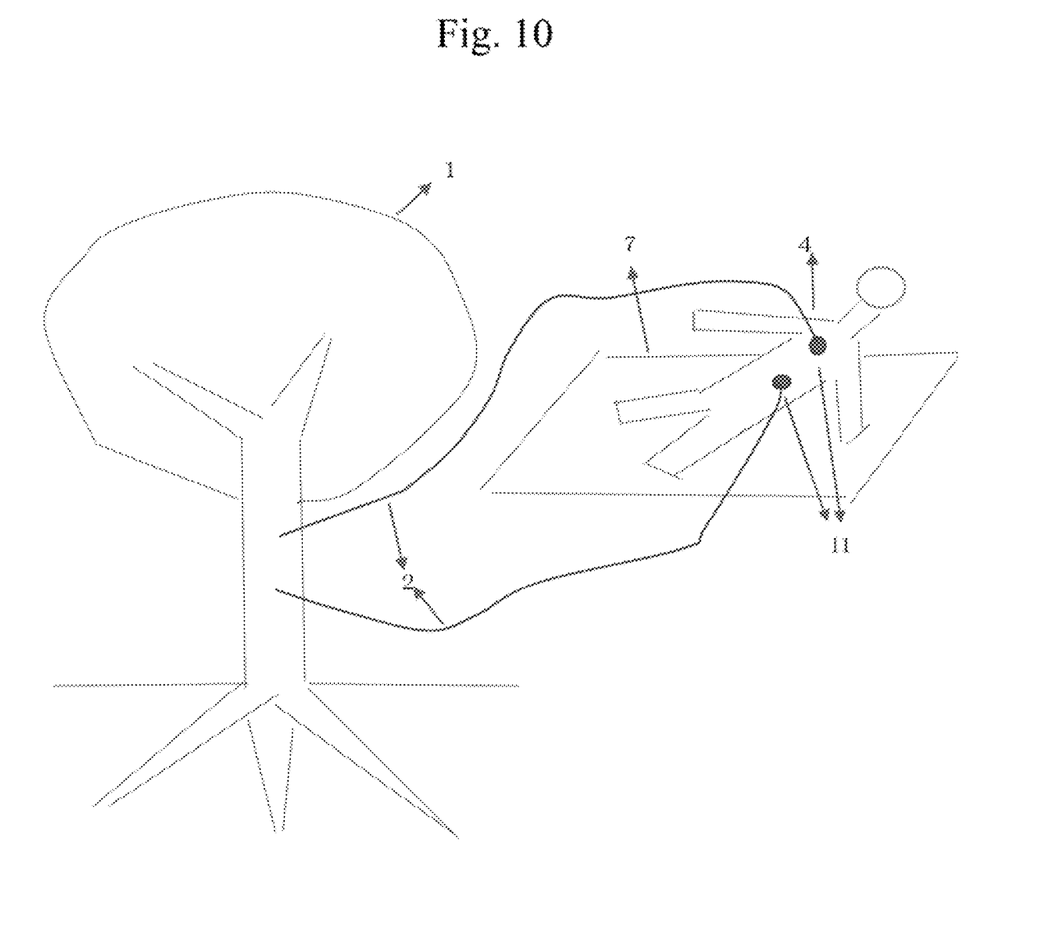
FIG. 10 is a drawing showing a state that a tree (1) growing on the ground is connected with a conductive material or conductive fiber (11) which can be attached to a human body, wound around the human body or contacted with the human body by using conductive wires (2). The electric potential is prevented from entering from the other portions than the tree. The electrical insulator (7) is sandwiched between the human (4) and the ground. The tree and the conductive wire may be connected with each other by using the methods shown in Embodiments 3, 4, 5 and 7.

As shown in FIG. 10, the tree (1) growing on the ground is connected with the conductive material or the conductive fiber (11) which can be attached to the human body, wound around the human body or contacted with the human body by using the conductive wires (2). The electric potential is prevented from entering from the other portions than the tree. The electrical insulator (7) is sandwiched between the human (4) and the ground. The tree and the conductive wire can be connected with each other by using the methods shown in Embodiments 3, 4, 5 and 7.

In all embodiments, the conductive fiber or the conductive material touched by the human can be integrated with the electrical insulator sandwiched between the ground and the conductive fiber or the conductive material.

In all embodiments, it is also possible to sandwich the electrical insulator between the human and the materials having electric charge or electric potential to prevent the electric charge from entering from the other portions than the tree growing on the ground. The conductive wires connecting the tree growing on the ground with the conductive material or the conductive fiber touched by the human and the conductive material itself can be covered with the electrical insulator to prevent the electric charge or electric potential from entering from the other than the tree. The above described embodiments can be combined with each other. When the conductive wires or the conductive material are contacted with the tree, the tree may be damaged if the conductive wires or the conductive material are inserted into the tree.

INDUSTRIAL APPLICABILITY

There is a method of promoting health by directly touching the tree for removing abnormal electric charge stored in the human body. The present invention enables the above described method for a long time for promoting health and medical treatment. There is a method of promoting health by directly touching the tree growing on the ground by hand or holding the tree by arms for removing abnormal electric charge stored in the human body. However, it is difficult to touch or hold the tree for a long time. Therefore, the above described method is achieved by using the conductive wires, the conductive fiber and the like so that human lies on the conductive fiber, for example. In addition, there are a large number of high-rise apartments in big cities. In such an environment, there is no garden and there is little thick tree growing on the ground. If the conductive wires can be attached to the thick tree in a facility, the present invention can be used in the facility. In high-rise apartments, for example, the tree growing on the ground is connected with the conductive fiber or the conductive material provided on a room by using long conductive wires so that electric charge and electric potential are not entered from the other portions than the tree and the human can lie or sit on the conductive fiber or the conductive material. The electric potential of the human is kept equal only to the electric potential of the tree growing on the ground.

DESCRIPTION OF THE REFERENCE NUMERALS

1: tree growing on ground
2: conductive wire through which electricity can flow
3: conductive material such as futon, carpet, bed sheet, bed mattress and floor cushion
4: human
5: device such as chair made of conductive material
6: conductive material, conductive fiber
7: electrical insulator
8: conductive fiber
9: rubber, rope or the like
10: thick conductive wire
11: support rod made of electrical insulator
12: conductive material or conductive fiber attached to, wound around or contacted with human body

The invention claimed is:

1. A method comprising: connecting an above-ground part of a tree growing on a ground with a conductive material or a conductive fiber by a conductive wire so that an electric potential is equal between the above-ground part of the tree and the conductive material or the conductive fiber and the conductive material or the conductive fiber is insulated from other materials than the tree by preventing an electric charge of the other materials from entering, the above-ground part of the tree having an electric potential different from the electric potential of the ground, and contacting the conductive material or the conductive fiber with a human without interposing an electrical insulator between the human and the conductive material or the conductive fiber to create a state where the human is in electrical contact with the tree so that the electric potential of the human is equal only to the electric potential of the tree growing on the ground.

2. The method according to claim 1, wherein
the conductive material or the conductive fiber is selected from the group consisting of a conductive futon, a conductive carpet, a conductive bed mattress, a conductive bed sheet and a conductive floor cushion.

3. The method according to claim 1, wherein
an electrical insulator is sandwiched between the ground and the conductive material or the conductive fiber to which the human is contacted so that the electric charge is not entered from the ground.

4. A method comprising: connecting a tree growing on a ground with a conductive material or a conductive fiber by a conductive wire so that an electric potential is equal between the tree and the conductive material or the conductive fiber and the conductive material or the conductive fiber is insulated from other materials than the tree by preventing an electric charge of the other materials from entering, contacting the conductive material or the conductive fiber with a human without interposing an electrical insulator between the human and the conductive material or the conductive fiber to create a state where the human is in electrical contact with the tree so that the electric potential of the human is equal only to the electric potential of the tree growing on the ground, and connecting the conductive wire at two or more portions of the tree and two or more portions of the conductive material or the conductive fiber.

\* \* \* \* \*